United States Patent [19]

Miller et al.

[11] 4,431,161
[45] Feb. 14, 1984

[54] ROTARY VALVE

[75] Inventors: Collier M. Miller, Rosemont; Robert Schmitz, Hatfield, both of Pa.

[73] Assignee: Honeywell Inc., Minneapolis, Minn.

[21] Appl. No.: 325,403

[22] Filed: Nov. 27, 1981

[51] Int. Cl.³ ............................................. F16K 31/02
[52] U.S. Cl. ................................. 251/133; 137/625.46; 137/246; 251/157; 251/192
[58] Field of Search ............. 137/246, 625.46, 625.11, 137/250; 251/133, 157, 192, 188

[56] References Cited

U.S. PATENT DOCUMENTS

| 330,164 | 11/1885 | Sloan | 137/625.11 |
| 1,036,558 | 8/1912 | Butz | 137/246 |
| 2,578,160 | 12/1951 | Van Der Werff | 137/625.11 |
| 3,008,490 | 11/1961 | Angelos | 137/625.11 |

FOREIGN PATENT DOCUMENTS 2204987  5/1978  Fed. Rep. of Germany ...... 137/246

Primary Examiner—Alan Cohan
Assistant Examiner—John A. Rivell
Attorney, Agent, or Firm—Lockwood D. Burton; Mitchell J. Halista

[57] ABSTRACT

A rotary valve has a valve body with a pair of fluid ports providing fluid exits on a face of the valve body. The fluid ports are connected to corresponding fluid channels in the valve body extending between the fluid ports and fluid inlet connections to the valve body. A fluid control plate is positioned in contact with the face of the valve body and extends across the fluid ports. The control plate has a fluid channel therein which is dimensioned to extend between the fluid ports in one position of the valve plate. The valve plate is axially mounted on an output shaft of a drive motor which is connected to the valve plate by a coupling shaft. The face of the valve body and the contacting face of the valve plates are ground precisely flat and after hard anodizing are coated with a low friction coating such as molydisulphide. The motor is arranged to urge the valve plate parallel to and against the face of the valve body by the weight of the motor and the connecting elements between the motor and the valve. The low friction coating allows a rotation of the valve plate on the valve body by the motor while providing a fluid seal therebetween to confine the fluid to the ports and channel in the valve plate. The coating exposes the ports to the channel in the valve plate in the one position of the valve plate and interrupts a fluid path between the ports and the channel in valve plate in a second position of the valve plate.

10 Claims, 4 Drawing Figures

ROTARY VALVE

BACKGROUND OF THE INVENTION

1. Field Of The Invention

The present invention relates to rotary valves. More specifically, the present invention is directed to a rotary valve having a motor driven fluid distrubtion plate for selectively innerconnecting fluid ports in a valve body.

A object of the present invention is to provide an improved rotary valve having a motor driven valve plate for selectively innerconnecting fluid ports in a valve body.

In accomplishing this and other objects, there has been provided, in accordance with the present invention, a rotary valve having a valve body with spaced apart fluid ports in a face of the valve body and a fluid control plate having fluid channels therein for selectively innerconnecting said fluid ports in one position of the valve plate. A motor means is arranged to drive the valve plate to selectively innerconnect the fluid ports by the fluid channel in the valve plate and to urge the valve plate against the face of the valve body by the force developed by the weight of the motor means. A low friction coating separating the contacting surfaces between the valve plate and the valve body provides a fluid seal therebetween to confine the fluid to the ports and channels.

BRIEF DESCRIPTION OF THE DRAWINGS

A better understanding of the present invention may be had when the following detailed description is read in connection with the accompanying drawing, in which.

DESCRIPTION OF THE PREFERRED EMBODIMENT

Detailed Description

Figure 1:
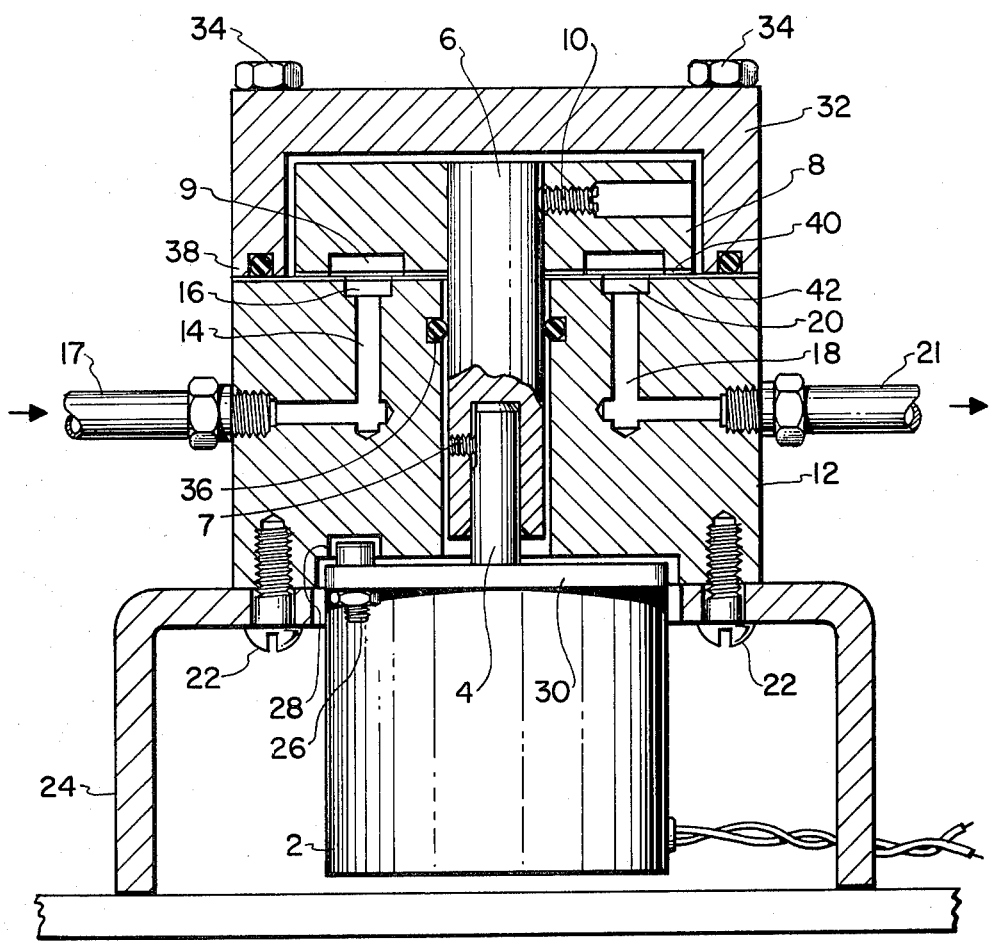
FIG. 1 is a cross-sectional illustration of a rotary valve embodying an example of the present invention.
Figure 2:
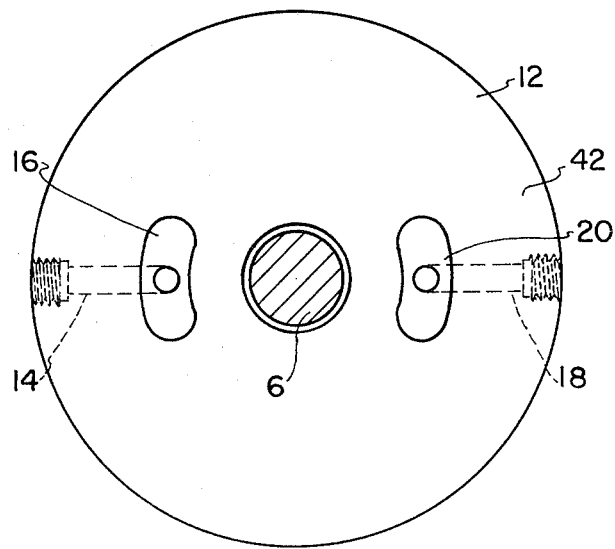
FIG. 2 is a top view of the valve body shown in FIG. 1.
Figure 3:
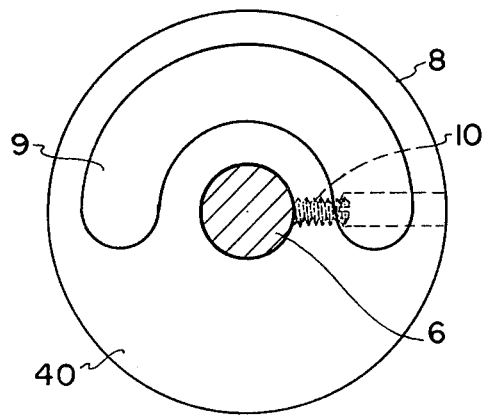
FIG. 3 is a bottom view of the valve plate shown in FIG. 1

Referring to FIGS. 1, 2 and 3 in more detail, there is shown a rotary valve having a drive motor 2 with a vertical output shaft 4. The output shaft 4 is connected to a coaxial coupling shaft 6 by set screws 7. The coupling shaft 6 is connected at the other end thereof to a valve plate 8 by set screws 10. The coupling shaft 6 is arranged coaxially with the valve plate 8 to rotatably drive the valve plate 8 in response to the rotation of the motor shaft 4 produced by a selective energization of the motor 2 located beneath the valve plate 8. A fluid channel 9 is provided in a face of the valve plate 8 to provide a fluid conducting means as described hereinafter to innerconnect fluid ports in a face of a valve body 12. The use of the term fluid herein is intended to encompass both liquid and gaseous media. The valve body 12 has a first internal fluid channel 14 extending between a first valve body fluid port 16 and a fluid inlet connection means, e.g., tube 17, connected to the valve body 12. A second fluid channel 18 is arranged in the valve body 12 between a second valve body fluid port 20 and a fluid outlet connection means, e.g., tube 21, connected to the valve body 12 by any suitable means such as those used for the inlet tube 17. The second fluid port 20 is spaced apart from the first fluid port 16 in the same face of the valve body 12. The fluid channel 9 is arranged to span the spacing between the fluid ports 16 and 18 in one position of the valve plate 8. It should be noted that while for purposes of simplifying the illustrations only two ports 16, 20 and one fluid channel 9 have shown, the valve structure of the present invention can include a greater number of fluid ports and channels to provide a multiple fluid and fluid path distribution control.

The valve body 12 is connected by bolts 22 to a valve support 24. A rigid pin 26 is arranged to project from the valve body 12 and to extend into an oversize hole 28 located in a radially outwardly extending flange 30 located on an end of the motor 2. The pin 26 is used to prevent rotation of the housing of the otherwise free hanging motor 2 with respect to the coupling shaft 6. A cover 32 is provided to cover the outer surface of the valve plate 8 and is attached to the valve body 12 by bolts 34. A first "O" ring 36 is provided between the coupling shaft 6 and the valve body 12 and a second "O" ring 38 is provided between the valve cover 32 and the valve body 18 to provide fluid seals therebetween. Low friction coatings 40, 42, e.g., molydisulphide are provided on the contacting surfaces of the valve plate 8 and the valve body 12, respectively, which surfaces are previously ground flat to a high degree of precision and hard anodized.

In operation, the valve motor 2 is arranged to rotatably drive the valve plate 8 to selectively innerconnect the fluid ports 16 and 18 by means of the fluid channel 9 in the valve plate 8. The weight of the free hanging motor 2 and motor flange 30 located beneath the valve plate 8 is transmitted to the valve plate 8 by means of the coupling shaft 6 to urge the valve plate 8 flat against the face of the valve body 12 having the fluid ports 16 and 18 therein. Thus, the valve plate 8 is rotated by the shaft 4 of the motor 2, and the fluid seal between the valve plate 8 and the valve body 12 is effected by the weight of the motor 2 and motor flange 30 on the coating 40. The pin 26 allows a vertical self-aligning movement of the motor 2 and motor flange 30 while preventing a rotation of the flange 30 and the outer housing of the motor 2. The low friction coating 40 enables the valve plate 8 to slide on the surface of the face of the valve body 12 having the ports 16 and 18 therein while effecting a fluid seal to prevent escape of the fluid controlled by the valve particularly during the time when the fluid channel 9 is positioned out of concurrent communication with the fluid ports 16 and 18.

Figure 4:
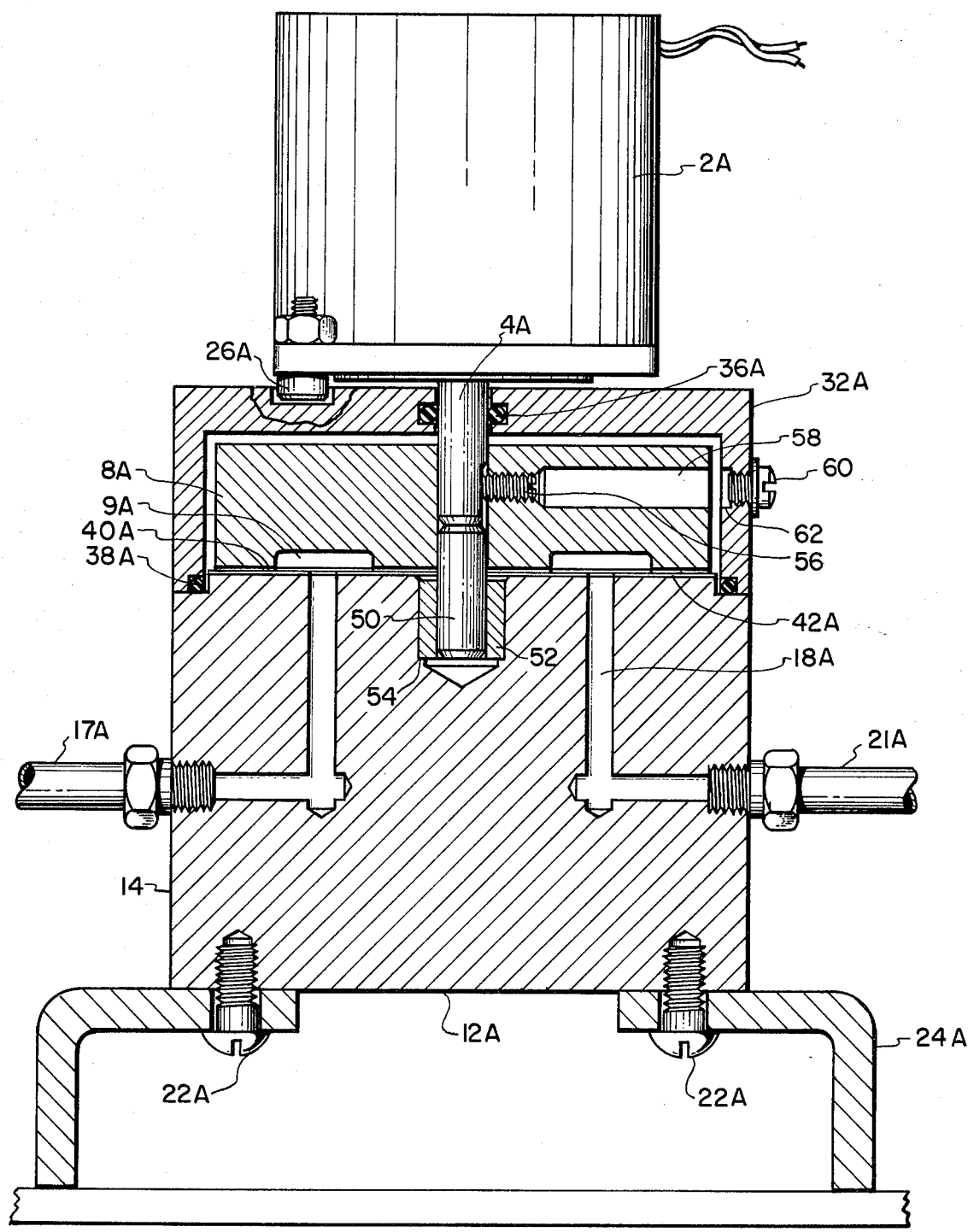
FIG. 4 is a cross-sectional illustration of an alternate arrangement of the valve shown in FIG. 1.

In FIG. 4, there is shown an alternate arrangement of the valve shown in FIG. 1. Reference numbers similar to those used in FIG. 1 have been used in FIG. 4 with the suffix "A" to indicate similar valve elements. In the arrangement shown in FIG. 4, the motor 2A is located above the valve plate 8A. However, the weight of the motor 2A is still transmitted to the valve plate 8A to urge the valve plate 8A against the valve body 12A to effect a fluid seal by means of the low friction coatings 40A and 42A. Additionally, the free end of the motor shaft 4A is arranged adjacent to one end of a coaxial stub shaft member 50 which has one end captured by the valve plate 8A. The other end of the stub shaft 50 is located in a low friction bushing 52 located in a well 54 in the valve body 12A. The bushing 52 allows a rotation of the stub shaft 50 and the valve plate 8A while maintaining the coaxial relationship with the motor shaft 4A. The operation of the valve shown in FIG. 4 is similar to that described above with respect to the fluid valving and fluid sealing features. The difference in structure, i.e., the location of the valve plate 8A with respect to the motor 2A, however, is still effective to urge the valve plate 2A flat against the valve body 12A to form a fluid seal by the low friction coatings 40A and 42A.

Accordingly, it may be seen that there has been provided, in accordance with the present invention, a rotary valve having a selectively driven valve plate for innerconnecting fluid ports.

The embodiments of the invention in which an exclusive property or privilege is claimed are defined as follows:

1. A valve comprising
   a valve body having at least two spaced apart fluid ports on a first face of said valve body,
   at least one fluid channel in said valve body between one of said ports and a fluid inlet means on said valve body and at least one fluid channel in said valve body between the other one of said ports and a fluid outlet means on said valve body,
   a selectively positionable valve plate having a fluid channel in a face thereof, said face of said valve plate being arranged to substantially cover said first face of said valve body to allow said fluid channel in said face of said valve plate to provide a fluid path between said fluid ports on said first face of said valve body in a first position of said fluid plate,
   a low friction coating separating said first face of said valve body from said face of said valve plate while exposing said spaced apart fluid ports to said fluid channel in said face of said valve plate in said position of said valve plate,
   motor means connected to said valve plate for selectively driving said valve plate between said first position and a second position wherein said fluid path between said spaced apart fluid ports is interrupted, and
   motor suspension means for suspending said motor means to allow the weight of said motor means to apply a pressure to said low friction coating.

2. A valve as set forth in claim 1 wherein said low friction coating is molydisulphide.

3. A valve as set forth in claim 1 wherein said low friction coating includes a first coating on said first face and a second coating on said face of said valve plate and said weight of said motor means urges said coatings into contact.

4. A valve as set forth in claim 1 wherein said valve plate is rotated by said motor means between said first and second positions.

5. A valve as set forth in claim 4 wherein said motor means includes a drive motor having an output shaft coaxial with said valve plate and attached to said valve plate.

6. A valve as set forth in claim 5 wherein said motor means is beneath said valve plate.

7. A valve as set forth in claim 5 wherein said motor means is above said valve plate.

8. A valve as set forth in claim 4 wherein said low friction coating includes a first coating on said first face and a second coating on said face of said valve plate and said weight of said motor means urges said coatings into contact.

9. A valve as set forth in claim 5 and further including restraining means extending between said valve body and said motor to restrict rotation of said motor means to said output shaft.

10. A valve as set forth in claim 1 and further including a cover attached to said valve body and covering said valve plate.

* * * * *